United States Patent
Ojeda Arroyo et al.

(10) Patent No.: US 9,598,741 B2
(45) Date of Patent: Mar. 21, 2017

(54) METHOD AND DEVICE FOR MEASURING LEVELS OF CAST IRON AND SLAG IN A BLAST FURNACE

(71) Applicant: Centre de Recherches Métallurgiques asbl—Centrum voor Research in de Metallurgie vzw, Brussels (BE)

(72) Inventors: Claudio Ojeda Arroyo, Liege (BE); Frédéric Durieu, Blegny (BE); Eric Esser, Verlaine (BE)

(73) Assignee: Centre de Recherches Métallurgiques asbl—Centrum voor Research in de Metallurgie vzw, Brussels (BE)

( * ) Notice: Subject to any disclaimer, the term of this patent is extended or adjusted under 35 U.S.C. 154(b) by 67 days.

(21) Appl. No.: 14/414,622

(22) PCT Filed: Jul. 9, 2013

(86) PCT No.: PCT/EP2013/064482
§ 371 (c)(1),
(2) Date: Jan. 13, 2015

(87) PCT Pub. No.: WO2014/009367
PCT Pub. Date: Jan. 16, 2014

(65) Prior Publication Data
US 2015/0218667 A1 Aug. 6, 2015

(30) Foreign Application Priority Data

Jul. 13, 2012 (BE) .................................. 2012/0493

(51) Int. Cl.
*G01F 23/00* (2006.01)
*C21B 7/24* (2006.01)
(Continued)

(52) U.S. Cl.
CPC .............. *C21B 7/24* (2013.01); *C21C 5/4673* (2013.01); *F27B 1/28* (2013.01); *F27D 21/0014* (2013.01);
(Continued)

(58) Field of Classification Search
CPC ........ G01F 23/246; G01F 23/14; G01F 23/22; C21C 5/4673; C21C 2005/5288;
(Continued)

(56) References Cited

U.S. PATENT DOCUMENTS 3,245,018 A * 4/1966 Russell .................... G01B 7/18
29/621.1
4,413,810 A 11/1983 Tenberg et al.
(Continued)

FOREIGN PATENT DOCUMENTS

DE 3436331 A1 4/1986
EP 2422900 A1 2/2012
(Continued)

OTHER PUBLICATIONS

S. Timoshenko; Roarks Formula for Strain and Stress; Strength of materials; chapters from a book; Chapter 8, Beams; Flexure of Straight Bars, 142 pages and Chapter 13, Shells of Revolution; Pressure Vessels; Pipes, 136 pages.

*Primary Examiner* — John Fitzgerald
*Assistant Examiner* — Truong Phan
(74) *Attorney, Agent, or Firm* — Reinhart Boerner Van Deuren P.C.

(57) ABSTRACT

The present invention relates to a method for measuring the liquid-metal surface level (13) and the slag surface level (14) in the crucible (1) of a metallurgical shaft furnace comprising the following steps: measuring, at one or more points on the external wall (2) of the crucible, the following variables: the circumferential strain in said external wall (2) by means (Continued)

of a number of strain-gauge sensors (6) fixed to the armor (4) of the external wall (2) of the crucible; and the temperature of said external wall (2) by means of one or more temperature sensors (7) fixed to the armor (4) of the external wall (2) of the crucible; introducing said variables measured at a number of points on the external wall of the crucible into the general equation governing circumferential strain, the solution of which is analytical, and which contains two unknowns, the liquid metal level and the overall liquid metal/slag level, considering set parameters; and solving said equation and obtaining an analytical solution giving the liquid metal surface level (13) and the slag surface level (14) in the crucible (1).

9 Claims, 4 Drawing Sheets (51) Int. Cl.
| | | |
|---|---|---|
| *C21C 5/46* | (2006.01) | |
| *G01F 23/14* | (2006.01) | |
| *G01F 23/22* | (2006.01) | |
| *F27B 1/28* | (2006.01) | |
| *F27D 21/00* | (2006.01) | |
| *G01F 23/24* | (2006.01) | |
| *C21C 5/52* | (2006.01) | |

(52) U.S. Cl.
CPC ......... *F27D 21/0028* (2013.01); *G01F 23/14* (2013.01); *G01F 23/22* (2013.01); *G01F 23/246* (2013.01); *C21C 2005/5288* (2013.01); *Y02P 10/216* (2015.11)

(58) Field of Classification Search
CPC ..... Y02P 10/216; C21B 7/24; F27D 21/0028; F27D 21/0014; F27B 1/28
USPC .................................. 73/299, 290 R; 266/89
See application file for complete search history.

(56) References Cited

U.S. PATENT DOCUMENTS

| | | | | |
|---|---|---|---|---|
| 5,493,903 | A | 2/1996 | Allen | |
| 5,748,666 | A * | 5/1998 | Andersson | B09B 3/005 373/108 |
| 6,127,915 | A * | 10/2000 | Gam | G01K 1/12 338/25 |
| 7,832,367 | B2 * | 11/2010 | Valentas | F23M 11/00 122/506 |
| 2002/0134794 | A1 | 9/2002 | McManus et al. | |
| 2004/0159161 | A1 * | 8/2004 | Barnett | G01D 3/022 73/766 |
| 2011/0094314 | A1 * | 4/2011 | Dekker | G01L 9/0042 73/862.045 |

FOREIGN PATENT DOCUMENTS

| | | |
|---|---|---|
| JP | 54130958 A | 10/1979 |
| JP | 60110821 A | 6/1985 |
| JP | 06271916 A | 9/1994 |
| JP | 11281467 A | 10/1999 |
| JP | 2003344142 A | 12/2003 |
| WO | WO 2011/038875 A1 | 4/2011 |

* cited by examiner

METHOD AND DEVICE FOR MEASURING LEVELS OF CAST IRON AND SLAG IN A BLAST FURNACE

FIELD OF THE INVENTION

The present invention relates to a method for measuring with precision the level of liquid metal as well as the level of dross or slag floating on the surface thereof inside the crucible of a metallurgical shaft furnace, in particular the level of cast iron and the level of slag in a blast furnace. Particularly, the method consists in using one or more strain gauge sensors mounted on the external wall of the blast furnace.

The invention also relates to a specific strain gauge sensor used in the method.

STATE OF THE ART

It is a known fact that a blast furnace is a carbothermic reduction furnace, designed to produce cast iron from iron ore. To achieve this, solid coke and iron ore are charged through the top of the furnace into a section known as the throat. Hot air (1200° C.) blown in at the base of the furnace causes the combustion of the coke. The carbon deriving from the coke is thus oxidised. This carbon monoxide will reduce the iron oxides and, as a result, isolate the metallic iron. The latter, however, gets progressively loaded with carbon as it descends into the blast furnace and is thus transformed into cast iron. At the outlet of a blast furnace, the dross, referred to in this case as slag, are recovered in the liquid state, in addition to the cast iron; they are made up of the earthy gangue of the ore, ash and fluxes. Their density being less than that of cast iron (approx. 3000 kg/m$^3$ and 7000 kg/m$^3$, respectively) causes them to float above the cast iron. These residues are thus considered to be co-products that should be separated from the cast iron after it is discharged through the tap hole.

To improve the management of the blast furnace and the casting operations, the level of cast iron as well as that of the slag should be known at all times.

To measure the surface level of cast iron found under a layer of liquid slag, it is a known practice to exploit the difference in electrical conductivity between cast iron and slag. U.S. Pat. No. 4,413,810 exploits this principle by using a measuring probe immersed in the metal bath. However, such a device does not allow to provide a reliable indication on the thickness of the slag layer because of the high temperature of the molten metal (above 1000° C.) which may interfere with the reading.

Document JP-11281467 exploits the difference in density between cast iron and slag in order to measure the level of their interface. The measurement device comprises a weight having a bulk density that is less than that of cast iron. The weight is connected by a suspension to pulleys and to a winding device. The pulleys are connected to resilient elements whose displacement allows to measure the length of the weight in suspension and thus to measure the surface level of cast iron. However, this technology does not allow to measure the surface level of the slag.

Document JP 2003-344142 proposes a solution to this problem. This document describes a method and an apparatus for measuring with precision the level of cast iron and the thickness of the slag layer, even in the case where the slag layer varies. The method uses incident microwaves at the surface of the cast iron on which the slag floats. The intensity of the reflected waves is recorded as a function of time. The method involves observing a peak A of maximum reflection followed in time by a peak B of lower intensity, successively. The surface level of cast iron is determined by measuring the distance of displacement of the microwaves during the time period comprised between the instant of emission of the waves and the instant of peak B. As for the thickness of the slag layer, it is determined by measuring the distance of displacement of the microwaves during the time period comprised between the instant of peak A and the instant of peak B.

The temperature of more than 1000° C. prevailing inside the crucible is thus a major obstacle to the development of methods for the precise measurement of liquid levels.

Along this line of thought, document JP06-271916 proposes using a measuring device located outside the crucible. This document describes a method for measuring the top level of the slag layer by means of the use of shock waves. Detectors of shock waves are arranged at different vertical positions outside the furnace. A shock wave is emitted and directed towards the interior of the crucible and the intensity of the reflected wave is detected by the wave detectors. The upper level of the slag is measured when the intensity of the reflected wave changes at the height of one of the detectors. However, this technology does not allow to measure the level of the cast iron-slag interface, the precise knowledge of which is absolutely crucial in order to separate the cast iron from the slag.

Document WO 2011/038875 discloses a mould for the transformation of molten metal, comprising a wall in which is arranged at least one sensor for detecting the temperature and/or the expansion of at least one part of the mould.

In order to allow efficient and effective monitoring of the mould, the sensor comprises at least one optical-wave guide, arranged in a groove formed in the wall of the mould.

The optical-wave guide is disposed to be bearing against the bottom of the groove and the space of the groove that is not filled by the optical-wave guide is at least in large part closed off by a filling material. It would not be possible to use this device in a blast furnace given that forming a groove in the wall is precluded at the risk of weakening the shielding of the crucible.

Document JP60110821 describes an installation comprising a plurality of furnaces (smelting, separation of slag, etc.) for the production of crude copper. This installation is controlled by means of a series of thermometers and strain gauges associated with each furnace.

Document JP54130958 describes a vessel for liquid metal in the wall of which are arranged, along a vertical direction, pressure sensors such as strain gauges, which are connected to a computing unit. The differences in pressure between the adjacent pressure sensors considered in pairs are calculated and compared in a logic circuit at several predetermined values, which allows to locate the liquid level between two adjacent detectors. This measurement is somewhat imprecise and does not allow to measure the level of any possible slag. This method cannot be applied to the thick wall of a blast furnace because the strain then affects all the gauges.

US document 2002/0134794 describes a cylindrical container intended to hold a pressurised fluid and comprising a system for monitoring pressure that is equipped with a strain sensor disposed on the external surface of the container, with a view to generating a response characteristic of the pressure correlated to the pressure of the fluid in the container. The response characteristic of the pressure is connected to the strain in the wall of the container caused by the pressure of the fluid by using equations that quantitatively determine the axial stress and the radial stress (biaxial stress) for given values of internal pressure and parameters linked to the dimensions of the cylinder (mean radius, thickness of the wall) and to the properties of the materials used. The application of these stresses causes axial and radial strains, respectively in the resilient material, which can be calculated in accordance with Hooke's law.

Aims of the Invention

The invention aims to provide a method for an application that has not yet been disclosed in the state of the art and does not have the drawbacks thereof.

In particular, the invention aims to provide a method that allows to measure with precision the surface level of cast iron and that of slag by means of one or more strain gauge sensors situated outside the blast furnace.

Main Characteristic Features of the Invention

A first aspect of the present invention relates to a method for measuring the surface level of liquid metal and the surface level of slag in the crucible of a metallurgical shaft furnace having an external wall provided with steel shielding, as well as a tap hole, the shielding of the external wall being positioned surrounding a refractory thickness in contact with the liquid metal, the shielding being provided on its external surface with several strain gauge sensors and with one or more thermal sensors, said sensors being mounted so as to be aligned in a vertical plane, on either sides of the tap hole and such that the two types of sensors are alternated in this vertical plane, said method comprising the following steps of:
- measuring at one or more points of the external wall of the crucible the following variables:
  - the circumferential strain of said external wall by means of the strain gauge sensors attached onto said shielding;
  - the temperature of said external wall by means of the thermal sensors attached onto said shielding;
- optionally measuring the circular pressure or static pressure of the hot blast in the furnace;
- introducing said variables measured at several points on the external wall of the crucible in the general equation governing the continuous circumferential strain, the solution of which is analytical and which contains two unknown values, the level of liquid metal and the overall level of liquid metal/slag, taking into consideration the following established parameters: the geometry of the shaft furnace, the parameters representative of the nature of the constituent materials of the shaft furnace, the thickness of the external wall of the shaft furnace at each point of measurement, the density of the liquid metal and of the slag; and
- solving said equation and obtaining the surface level of liquid metal and the surface level of slag in the crucible.

Specific metallurgical shaft furnaces such as the electric furnace or the converter are not operated under overpressure, due to which the measurement of pressure becomes unnecessary.

A second aspect of the invention relates to an external wall of the crucible of a metallurgical shaft furnace, comprising a shielding and provided with a device for measuring the surface level of liquid metal and the surface level of slag in the crucible of the furnace, characterised in that said device comprises a plurality of strain gauge sensors and one or more thermal sensors, attached onto said shielding, in that the sensors are mounted so as to be aligned in a vertical plane, and in that the two types of sensors are alternated in the vertical plane.

A third aspect of the invention relates to a blast furnace comprising a crucible with an external wall, said external wall comprising a shielding provided with a device for measuring the surface level of cast iron and the surface level of slag in the crucible, as described above.

According to preferred embodiments, the invention will be further limited by one or an appropriate combination of the following characteristic features:
- the general equation governing the continuous circumferential strain of the external wall is, in the case of a blast furnace:

$$y = y_0 F_1 + \frac{\Psi}{2\lambda} F_2 + LT \quad (1)$$

where $F_1$ and $F_2$ are constants for a given blast furnace at each height of measurement:

$$F_1 = \cosh(\lambda x) \cos(\lambda x) \quad (2)$$

$$F_2 = \cosh(\lambda x) \sin(\lambda x) + \sinh(\lambda x) \cos(\lambda x) \quad (3)$$

and $$\lambda = \left[ \frac{3(1 - \nu^2)}{R^2 t^2} \right]^{1/4} \quad (4)$$

where y is the horizontal deflection (or displacement) measured and corrected as a function of the measured temperature, x is the vertical position, R is the mean radius at each height, t is the thickness of the wall at each height and ν is Poisson's ratio;

the other terms depending on the pressure applied to the wall of the shaft furnace:
- $y_0$ is the deflection or displacement at the level of the nozzles;
- ψ is the angle of the strained wall at the level of the nozzles;
- LT is the load term which is proportional to the force applied over the structure;

a final transformation being performed over the pressures P in order to take into account the fact that the crucible of the blast furnace is constructed with materials having different mechanical properties, refractory material and steel shell, and with various thicknesses differing as a function of the height ($E_x$=Young's modulus of the material x):

$$P_{across\ steel\ shell} = \quad (5)$$

$$P_{int.across\ refractory} = \frac{E_{steel} \text{Thickness}_{Steel\ shell}}{E_{steel} \text{Thickness}_{Steel\ shell} + E_{refract}.\text{Thickness}_{refract.}};$$

with the relationship between the static pressure P and the level of liquid metal or slag h being given by a relation of the type P=ρ·g·h, where ρ is the average density and g is the acceleration due to gravity;

the measurements of circumferential strain and temperature are carried out continuously and/or in real time;

the strain gauges are at least partially welded to said shielding itself;

the strain gauge sensor comprises a protective cover attached mechanically onto the shielding, of which the sealing with respect to the shielding is ensured by means of a resilient sealing gasket;

the strain gauge sensor comprises four strain gauges, of which two gauges are not completely attached to the shielding; and each thermal sensor is a platinum-resistance thermometer; the measuring device is arranged between the channels of a channel-based cooling circuit mounted onto or in the wall.

The invention is not limited to the use in a blast furnace, but could be implemented on any type of furnace or metallurgical vessel containing liquid metal (electric furnace, converter, etc).

DESCRIPTION OF PREFERRED EMBODIMENTS OF THE INVENTION

Figure 1:
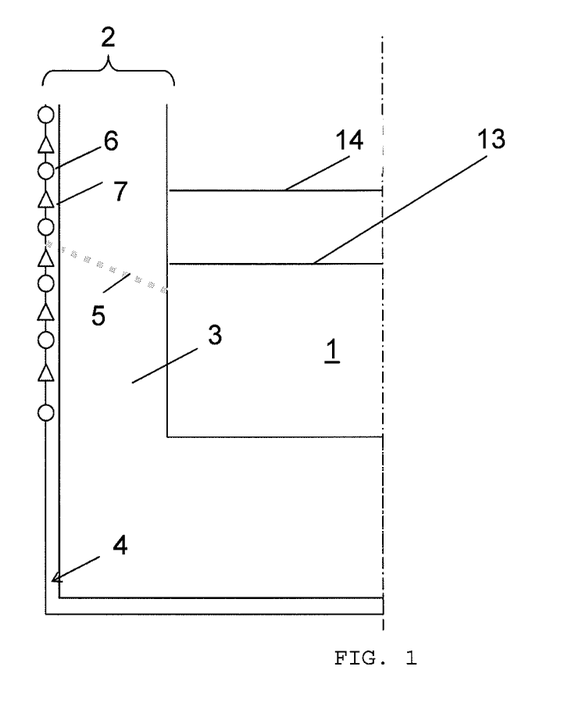
FIG. 1 is a schematic representation of the vertical cross-section of the crucible of a blast furnace.

FIG. 1 is a schematic representation of the vertical cross-section of the wall 2 of the crucible 1 of a blast furnace. The wall is made up of refractory materials 3 and of a steel shielding 4. According to a preferred embodiment of the device of the invention, the steel shielding of the external wall is equipped with strain gauge sensors 6 represented by circles alternating with thermal sensors 7 represented by triangles. FIG. 1 shows a non-limiting example with six strain gages sensors 6 and five thermal sensors 7, attached onto the external surface of the steel shielding 4. The positioning of the tap hole 5 is also indicated.

At the high temperatures prevailing within the crucible 1, the refractories 3 may soften and/or be subject to erosion and corrosion. Without a cooling system, their operational life would be limited. The cooling is achieved by circulating water through the plates and pipes encased in the walls of the blast furnace. The crucible 1 of a blast furnace may be cooled either by water flowing through the cooling plates inside the wall of the crucible or by water flowing in the open air along the external wall.

Figure 2:
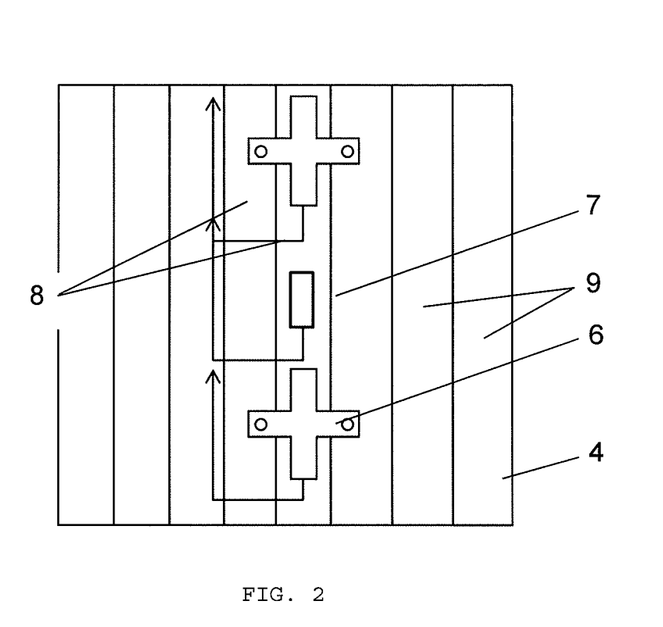
FIGS. 2 and 3 are elevation views of two variants of the external steel shielding of the crucible of a blast furnace equipped with the measuring device according to the invention and which differ from each other in their cooling systems.

In FIG. 2, a cooling system based on the use of water channels is implemented, the channels 9 being schematically represented by vertical lines.

Figure 3:
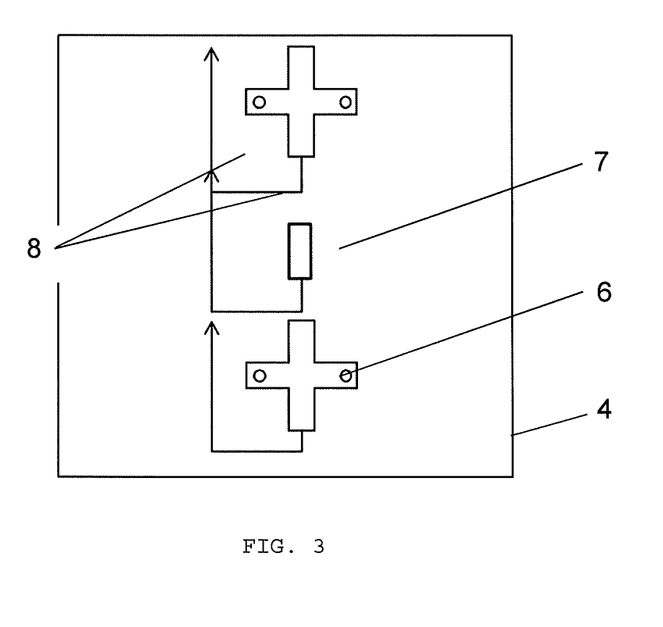

In FIG. 3, the cooling is achieved by means of water flowing in the open air along the external wall.

In FIGS. 2 and 3, the steel shielding 4 of the external wall 2 of the crucible 1 is provided, according to the device of the invention, by way of illustration, with two strain gauge sensors 6 represented by arrangements in the form of "crosses" and one thermal sensor 7 represented by a rectangle. The arrows represent the wiring 8 of the sensors to a device for recording and storing data.

Figure 4:
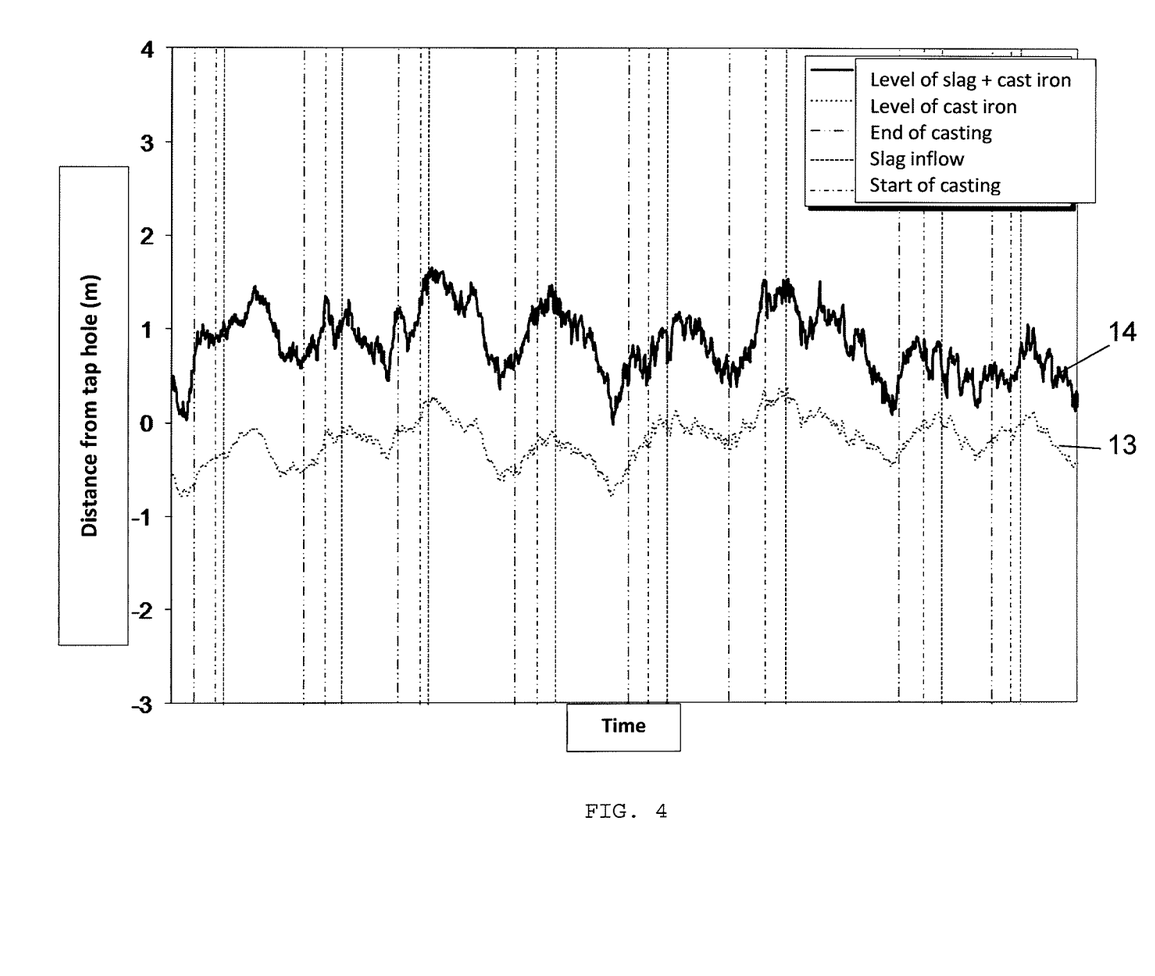
FIG. 4 is a graphical representation of the measurement of the surface level of cast iron as well as the surface level of slag over time, obtained according to the method of the invention.

FIG. 4 is a graphical representation of the measurement, according to the invention, of the surface level of slag 14 (upper curve indicating the cumulative level of cast iron and slag) as well as the level of cast iron 13 (lower curve) as a function of time, the distance of these levels being measured relative to the tap hole 5.

Figure 5:
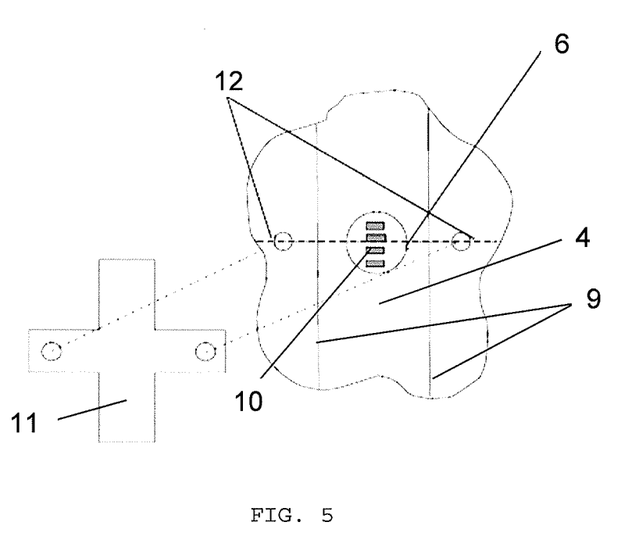
FIG. 5 is a detailed view of a strain gauge sensor welded onto the steel shielding of the crucible of a blast furnace, according to the present invention.

FIG. 5 is detailed view of a sensor based on stress or strain gauges 6 attached onto the steel shielding 4 of the external wall 2 of the crucible 1. The sensor comprises four individual measurement gauges 10 represented by rectangles. Preferably, two gauges are completely welded onto the shielding 4, while the other two gauges are not completely welded onto the wall so as to allow for a correction of temperature (expansion of the gauges). The gauge comprises a cover 11 fastened by means of a system of screws and bolts 12 onto the shielding 4. The channels 9 of the cooling system are represented by vertical lines. The sealing of the cover 11 relative to the shielding is ensured by means of a resilient sealing gasket, for example made of silicone (not shown). The cross-shaped form of the sensor in the figures is the result of a form of cover 11 that is substantially vertical and of a substantially horizontal cross piece to fasten the cover to the shielding. Thus, it is the gauges that are rigidly secured onto the shielding and not the cover.

The principle of the method is as follows: the cast iron and the slag exert a differential pressure on the wall of the refractories 3 inside the crucible 1, which pressure will be transferred to the shielding 4 of the external steel wall 2.

The variation in static pressure in the blast furnace caused by the variation in the surface levels of cast iron 13 and slag 14 will induce a variation in the strain of the shielding 4.

The direct measurements of the strain and temperature of the shielding, as well as the measurement of circular pressure (static pressure of the "hot blast", i.e. the gases circulating in the blast furnace) are the input data for a system of equations of which the analytical solution will give the surface levels of cast iron 13 and slag 14 in the crucible 1.

The system of equations takes into account the following established parameters:

the geometry of the blast furnace;

the nature of the constituent materials of the blast furnace (via Young's modulus, Poisson's ratio, etc, of the steel and the refractory);

the thickness of the external wall (including the refractory) of the blast furnace at each point of measurement;

the density of cast iron and slag.

It will be noted that the temperature values measured at the level of the thermal sensors installed on the external surface of the shielding allow the correction of temperature of the strains measured according to the following equation:

$$\text{Corrected Strain} = \text{Measured Strain} - \alpha \cdot \Delta T,$$

where $\alpha$ is the thermal expansion coefficient and $\Delta T$ is the difference between the measured temperature and the reference temperature.

The results of calculation with several points of measurement are provided in FIG. 4 (solid line: overall slag and cast iron level; dotted line: cast iron level). FIG. 4 also shows the different steps of a casting process: opening of the tap hole (casting starts), flow of molten cast iron, the slag possibly still accumulating, flow of molten cast iron and slag (slag inflow), low levels reached and outlet of gas, re-plugging of the tap hole (casting ends).

The measurements of circumferential strain and temperature are preferably carried out on a continuous basis and/or in real time.

In the variant embodiment where there is only one point of strain measurement, it should be near the level of the tap hole (for example at a distance of one meter) and only allows to calculate the overall level of cast iron and slag. In this case, the overall level is obtained from the static pressure value at the tap hole. This latter is obtained as the unknown value from an equation wherein the measurement given by the strain gauge is a function of the static pressure, the circular pressure, the geometry of the crucible (radius), the thickness of the walls (steel, refractory), and the respective Young's moduli (steel, refractory). To obtain the level as a function of the static pressure, a value of 3300 kg/m$^3$ for density is adopted, which is an intermediate value between the density of cast iron and that of pure slag. The signal from the strain gauges is filtered to eliminate the medium-term fluctuations linked to the changes in temperature. This gives a good correlation with the results of the digital models.

In the second variant embodiment, there are several strain gauge sensors disposed over a generatrix of the furnace, on either sides of the tap hole, at a suitable height. The problem is simplified by using the superposition method. Three assumptions are formulated: Hooke's law is valid for all materials involved, the strains are small as compared to the size of the structure, and the deflection does not alter the action of the forces applied. The forces acting on the furnace are the following:

pressure of gas acting on the internal surface;
static pressure acting on the internal wall up to the liquid metal-slag interface;
static pressure of the liquid metal-slag interface on the hearth;
stress on the bottom;
stress at the level of the nozzles.

The two unknown values of the problem are at all times the level of liquid metal and the overall level of liquid metal-slag. The problem is solved by the presence of several sensors over one single generatrix.

The general equation governing the continuous circumferential strain of the external wall (shielding) takes into account the continuity of the material and depends on the deflection at the nozzles, on the angle formed by the strained wall to the nozzles and on the load term which depend on the force applied to the structure. The parameters of the equation are constants that depend on Poisson's ratio and Young's modulus of the constituent materials of the wall (steel shielding and refractories), on the thickness of the wall at each height and on the mean radius at each height. Also taken into account is the variable thickness of the refractory with the height (General references: Roark's Formulas for Strain and Stress; *Strength of materials*, S. Timoshenko).

More precisely, the general equation governing the continuous circumferential strain of the external wall is:

$$y = y_0 F_1 + \frac{\Psi}{2\lambda} F_2 + LT \quad (1)$$

where $F_1$ and $F_2$ are constants for a given blast furnace at each measurement height:

$$F_1 = \cosh(\lambda x) \cos(\lambda x) \quad (2)$$

$$F_2 = \cosh(\lambda x) \sin(\lambda x) + \sinh(\lambda x) \cos(\lambda x) \quad (3)$$

and $$\lambda = \left[ \frac{3(1-v^2)}{R^2 t^2} \right]^{1/4} \quad (4)$$

where y is the horizontal deflection or displacement measured, x is the vertical position, R is the mean radius at each height, t is the thickness of the wall at each height and v is Poisson's ratio.

The other terms depend on the pressure applied to the wall of the blast furnace:

$y_0$ is the deflection or displacement at the level of the nozzles;
$\psi$ is the angle formed by the strained wall at the level of the nozzles;
LT is the load term which is proportional to the force applied over the structure.

A final transformation is performed to take into account the fact that the crucible of the blast furnace is constructed with materials having different mechanical properties (refractory and steel shell) and with various thicknesses differing as a function of the height ($E_x$=Young's modulus of material x):

$$P_{across\ steel\ shell} = \quad (5)$$
$$P_{int.across\ refractory} = \frac{E_{steel} \text{Thickness}_{Steel\ shell}}{E_{steel}\text{Thickness}_{Steel\ shell} + E_{refract.}\text{Thickness}_{refract.}};$$

Finally, the relationship between static pressure P and level of liquid metal or slag h is given by a relation of the type P=ρ·g·h, where ρ is the average density and g is the acceleration due to gravity.

The role of the stress or strain gauges is to translate the strain undergone by a test body (here, a substantially cylindrical body) into variation in electrical resistance. More precisely, the variation in electrical resistance of the gauge is proportional to its strain (piezo resistor). It is the coefficient or gauge factor k which translates this proportionality, according to the following relationship:

$$\Delta R/R = k \cdot \Delta L/L,$$

where k is a constant that depends on the materials considered and on the temperature. It characterises the sensitivity of the gauge.

Each gauge consists of a set of closely spaced turns of resistance wire, made from a thin metal sheet bonded onto a flexible and insulating support, obtained by means of photogravure according to the technique used for printed circuits.

The strain gauge may be made of different materials: alloy steels, stainless steels, aluminum, semiconductors, etc.

The different types of strain gauge sensors and their mounting are indeed well known by the person skilled in the art and are not limiting the scope of the present invention.

The thermal sensors according to the invention are preferably platinum-resistance thermometers, and more preferably Pt100 thermometers (resistance of 100 ohms at 0° C. and 138.5 ohms at 100° C.)

The device of the invention presents the following advantages. Its installation is simple and entails modest costs. The device allows for easy and rapid installation and possible replacement given that it is placed on the external wall of the blast furnace, which does not get heated to high temperatures.

The measurement system yields good results on crucibles that are cooled both by means of open-air sprayers (spray cooling) as well as by water-channel circuits (channel cooling). However, during implementation, for spray cooling, the cooling of the sector where the gauges are installed must be temporarily interrupted, which involves the temporary shutdown of the blast furnace. This problem does not exist for blast furnaces having systems of the "channel cooling" type, if the measuring device is installed, for example, in the space between two channels, and the installation can be carried out during the normal operation of the blast furnace.

The sensors do not necessarily have to be spaced at equidistance over a generatrix. If the density of sensors is greater near the tap hole, a far greater precision in calculation is obtained.

Key 1. blast-furnace crucible
2. wall of the crucible
3. refractories
4. steel shielding
5. tap hole
6. strain gauge sensor
7. thermal sensor
8. wiring
9. cooling channels
10. strain gauge
11. cover
12. bolts
13. surface level of cast iron
14. surface level of slag

The invention claimed is:

1. A method for measuring the surface level of liquid metal (13) and the surface level of slag (14) in a crucible (1) of a metallurgical shaft furnace having an external wall (2) provided with a shielding made of steel (4), as well as a tap hole, the shielding (4) of the external wall surrounding a refractory thickness (3) in contact with the liquid metal, the shielding (4) being provided on its external surface with a plurality of strain gauge sensors (6) and with one or more thermal sensors (7), said sensors (6,7) being mounted so as to be aligned in a vertical plane, on either sides of the tap hole and such that the two types of sensors are alternated in this vertical plane, said method comprising the following steps of:
measuring at a number of points of the external wall (2) of the crucible the following variables:
    the circumferential strain of said external wall (2) by means of the strain gauge sensors (6) attached onto said shielding (4);
    the temperature of said external wall (2) by means of thermal sensors (7) attached onto said shielding (4);
measuring the circular pressure or static pressure of the hot blast in the furnace if the furnace is operated under overpressure;
introducing said variables measured at said number of points on the external wall of the crucible in a general equation governing the continuous circumferential strain the solution of which is analytical, and which contains two unknown values, the level of liquid metal and the overall level of liquid metal-slag, said general equation involving the following established parameters; the geometry of the shaft furnace, the parameters representative of the nature of the constituent materials of the shaft furnace, the thickness of the external wall of the shaft furnace at each point of measurement, the density of liquid metal and of slag; and solving said equation and obtaining the surface level of liquid metal (13) and the surface level of slag (14) in the crucible (1);
characterized in that the General equation governing the continuous circumferential strain of the external wall is, in the case of a blast furnace, as follows:

$$y = y_0 F_1 + \frac{\psi}{2\lambda} F_2 + LT$$

where $F_1$ and $F_2$ are constants for a given blast furnace at each measurement height;

$$F_1 = \cosh(\lambda x)\cos(\lambda x)$$

$$F_2 = \cosh(\lambda x)\sin(\lambda x) + \sinh(\lambda x)\cos(\lambda x)$$

and $$\lambda = \left[\frac{3(1-v^2)}{R^2 t^2}\right]^{1/4}$$

where y is the horizontal deflection (or the displacement) measured and corrected as a function of the tem orange measured, x is the vertical position, R is the mean radius at each height, t is the thickness of the wall at each height and v is Poisson's ratio;
the other terms depending on the pressure applied to the wall of the shaft furnace:
    $y_0$ is the deflection or displacement at the level of at least one nozzle;
    $\psi$ is the angle of the strained wall at the level of at least one nozzle;
    LT is the load term which is proportional to the force applied over the wall of the furnace;
a final transformation being performed over the pressures P in order to take into account the fact that the crucible of the blast furnace is constructed with materials having different mechanical properties, refractory material and steel shell, and with various thicknesses differing as a function of the height (Ex=Young's modulus of the material x):

$$P_{across\ steel\ shell} =$$

$$P_{int.across\ refractory} = \frac{E_{steel}\text{Thickness}_{Steel\ shell}}{E_{steel}\text{Thickness}_{Steel\ shell} + E_{refract.}\text{Thickness}_{refract.}};$$

with the relationship between the static pressure P and the level of liquid metal or slag h being given by a relation of the type P=ρ*g*h, where ρ is the average density and g is the acceleration due to gravity.

2. A method according to claim 1, characterized in that the measurements of circumferential strain and temperature are carried out continuously and/or in real time.

3. An external wall (2) of a crucible of the metallurgical shaft furnace, comprising a steel shielding (4) as well as a tap hole, the shielding (4) being provided with a device for measuring the surface level of liquid metal (13) and the surface level of slag (14) in the crucible (1) of the furnace, for the implementation of a method for measuring the surface level of liquid metal (13) and the surface level of slag (14) in said crucible, said measuring device comprising a plurality of strain gauge sensors (6) and one or more thermal sensors (7) attached onto the external surface of said shielding (4), the sensors (6,7) being mounted so as to be aligned in a vertical plane, on either sides of the tap hole, and the two types of sensors being alternated in the vertical plane, in such a manner that the strain gauge sensors (6) are configured to measure a first variable, the circumferential strain of said external wall (2), at a plurality of points of the latter, and that the thermal sensors can measure a second variable, the temperature of said external wall (2), at one or more points of the latter, so as to be able to introduce said first and second variables measured at a plurality of points of the external wall of the crucible in a general equation governing the continuous circumferential strain the solution of which is analytical, and which contains two unknown values, the level of liquid metal and the overall level of liquid metal-slag, said general equation involving the following established parameters: the geometry of the shaft furnace, the parameters representative of the nature of the constituent materials of the shaft furnace, the thickness of the external wall of the shaft furnace at each point of measurement, the density of liquid metal and of slag; and to finally solve said general equation and obtain a value for the surface level of liquid metal (13) and the surface level of slag (14) in the crucible (1); characterized in that the general equation governing the continuous circumferential strain of the external wall is in the case of a blast furnace, as follows:

$$y = y_0 F_1 \left| \frac{\psi}{2\lambda} F_2 \right| LT$$

where $F_1$ and $F_2$ are constants for a given blast furnace at each measurement height:

$$F_1 = \cosh(\lambda x)\cos(\lambda x)$$
$$F_2 = \cosh(\lambda x)\sin(\lambda x) + \sinh(\lambda x)\cos(\lambda x)$$
$$\text{and } \lambda = \left[\frac{3(1-v^2)}{R^2 t^2}\right]^{1/4}$$

where y is the horizontal deflection (or the displacement) measured and corrected as a function of the temperature measured, x is the vertical position, R is the mean radius at each height, t is the thickness of the wall at each height and v is Poisson's ratio;
the other terms depending on the pressure applied to the wall of the shaft furnace:

$y_0$ is the deflection or displacement at the level of at least one nozzle;
$\psi$ is the angle of the strained wall at the level of at least one nozzle;
LT is the load term which is proportional to the force applied over the wall of the furnace;
a final transformation being performed over the pressures P in order to take into account the fact that the crucible of the blast furnace is constructed with materials having different mechanical properties, refractory material and steel shell, and with various thicknesses differing as a function of the height (Ex=Young's modulus of the material x):

$$P_{across\,steel\,shell} =$$
$$P_{int.across\,refractory} = \frac{E_{steel}\text{Thickness}_{steel\,shell}}{E_{steel}\text{Thickness}_{steel\,shell} + E_{refract}\text{Thickness}_{refract.}}$$

with the relationship between the static pressure P and the level of liquid metal or slag h being given by a relation of the type P=ρ*g*h, where ρ is the average density and g is the acceleration due to gravity.

4. A wall according to claim 3, characterized in that the strain gauges (10) are welded to said shielding (4) itself and in that the strain gauge sensor (6) comprises a protective cover (11) attached mechanically onto the shielding (4), said protective cover (11) comprising a sealing with respect to the shielding which is ensured by means of a resilient sealing gasket.

5. A wall according to claim 3, characterized in that each thermal sensor (7) is a platinum-resistance thermometer.

6. A wall according to claim 3, characterized in that the measuring device is arranged between channels (9) of a channel-based cooling circuit mounted onto or in the wall.

7. A blast furnace comprising a crucible provided with an external wall (2), said external wall comprising a shielding (4) provided with a device for measuring the surface level of cast iron (13) and the surface level of slag (14) in the crucible (1), according to claim 3.

8. A wall according to claim 3, characterized in that the strain gauge sensor (6) comprises four strain gauges (10).

9. A wall according to claim 8, characterized in that two of the gauges (10) are completely welded onto the shielding and two gauges are not completely welded onto the shielding, these latter two gauges allowing for a correction of temperature.

* * * * *

UNITED STATES PATENT AND TRADEMARK OFFICE
CERTIFICATE OF CORRECTION

PATENT NO. : 9,598,741 B2
APPLICATION NO. : 14/414622
DATED : March 21, 2017
INVENTOR(S) : Claudio Ojeda Arroyo et al.

It is certified that error appears in the above-identified patent and that said Letters Patent is hereby corrected as shown below:

In the Claims

Column 10, Line 14:
After the word "height" the ";" should be deleted and replaced with a --:--

Column 10, Line 26:
The words "tem orange" should correctly read --temperature--

Column 11, Line 25:
A --,-- should be inserted between the words "is" and "in"

Column 11, Line 28:
The equation is incorrect, it should correctly read:

$$y = y_0 F_1 + \frac{\Psi}{2\lambda} F_2 + LT$$

Signed and Sealed this
Tenth Day of October, 2017

Joseph Matal
*Performing the Functions and Duties of the*
*Under Secretary of Commerce for Intellectual Property and*
*Director of the United States Patent and Trademark Office*